United States Patent
Kamei

(10) Patent No.: US 10,213,900 B2
(45) Date of Patent: Feb. 26, 2019

(54) ABRASIVE MATERIAL

(71) Applicant: KAMEI TEKKOUSHO LTD., Higashiosaka-shi, Osaka (JP)

(72) Inventor: Haruo Kamei, Higashiosaka (JP)

(73) Assignee: KAMEI TEKKOUSHO LTD., Osaka (JP)

( * ) Notice: Subject to any disclaimer, the term of this patent is extended or adjusted under 35 U.S.C. 154(b) by 0 days.

(21) Appl. No.: 15/442,042

(22) Filed: Feb. 24, 2017

(65) Prior Publication Data

US 2017/0246725 A1    Aug. 31, 2017

(30) Foreign Application Priority Data

Feb. 25, 2016   (JP) ................ 2016-034221

(51) Int. Cl.
*C09K 3/14*   (2006.01)
*C09G 1/00*   (2006.01)
*B24C 11/00*  (2006.01)

(52) U.S. Cl.
CPC ............ *B24C 11/00* (2013.01); *B24C 11/005* (2013.01); *C09K 3/1436* (2013.01)

(58) Field of Classification Search
CPC ................................ C09G 1/00; C09K 3/1436
See application file for complete search history.

(56) References Cited

U.S. PATENT DOCUMENTS

| | | | |
|---|---|---|---|
| RE20,538 E | 10/1937 | Minich | |
| 2,118,832 A | 5/1938 | Wean | |
| 2,286,754 A | 6/1942 | Minich | |
| 2,364,077 A | 12/1944 | Keefer | |
| 2,684,062 A | 7/1954 | Rose | |
| 2,779,455 A | 1/1957 | Sinclair | |
| 4,625,466 A | 12/1986 | Saigusa | |
| 4,718,398 A | 1/1988 | Hallez | |

(Continued)

FOREIGN PATENT DOCUMENTS

| | | |
|---|---|---|
| EP | 0798081 | 3/1997 |
| JP | 62-223498 | 10/1987 |

(Continued)

OTHER PUBLICATIONS

Notice of Allowance, U.S. Appl. No. 14/773,777 (dated Jul. 12, 2017).

(Continued)

*Primary Examiner* — Pegah Parvini
(74) *Attorney, Agent, or Firm* — Thompson Hine LLP

(57) ABSTRACT

Provided is an abrasive material having a grinding force more appropriate to the purpose of surface finishing. The abrasive material is intended to be used for surface finishing by spraying onto a workpiece, and comprises a plurality of abrasive material particles each comprising a core, a binder, and an abrasive grain layer formed on a surface of the core via the binder, wherein the binder is a mixture of a non-curable adhesive used as a main ingredient to provide tackiness and another agent used to adjust hardness according to a desired surface roughness of the workpiece. The hardness of the binder is adjusted to be higher or lower than that of the non-curable adhesive itself as a main ingredient. The binder may have the property of a cured material or the property of a fluid.

8 Claims, 2 Drawing Sheets

(56) References Cited

U.S. PATENT DOCUMENTS

| | | | |
|---|---|---|---|
| 4,753,838 A | 6/1988 | Kimura | |
| 4,954,140 A * | 9/1990 | Kawashima | B24D 3/28 |
| | | | 51/293 |
| 5,423,713 A | 6/1995 | Mishima | |
| 5,495,844 A | 3/1996 | Kitajima et al. | |
| 5,672,382 A * | 9/1997 | Lux | B01J 8/1836 |
| | | | 427/213 |
| 6,146,247 A | 11/2000 | Nokubi et al. | |
| 6,183,347 B1 | 2/2001 | Shaw | |
| 6,251,002 B1 | 6/2001 | Close | |
| 6,652,967 B2 * | 11/2003 | Yadav | B01J 12/02 |
| | | | 427/201 |
| 7,214,126 B1 * | 5/2007 | Kamei | B24D 3/20 |
| | | | 451/330 |
| 7,435,276 B2 * | 10/2008 | Chen | B23D 61/18 |
| | | | 428/403 |
| 7,887,608 B2 * | 2/2011 | Schwabel | B24D 3/16 |
| | | | 428/357 |
| 2012/0301522 A1 * | 11/2012 | Prosise | A61Q 11/00 |
| | | | 424/401 |
| 2016/0016288 A1 | 1/2016 | Kamei | |

FOREIGN PATENT DOCUMENTS

| | | |
|---|---|---|
| JP | 11-347945 | 12/1999 |
| JP | 3800610 | 7/2006 |

OTHER PUBLICATIONS

U.S. Office Action, U.S. Appl. No. 14/773,777 (dated Apr. 26, 2017).

U.S. Office Action, U.S. Appl. No. 14/773,777 (dated Nov. 18, 2016).

PCT, English translation of the International Preliminary Report on Patentability, PCT/JP2014/053437 (dated Sep. 24, 2015).

PCT, International Search Report, PCT/JP2014/053437, (dated Apr. 15, 2014, published Sep. 18, 2014).

* cited by examiner

Fig.1
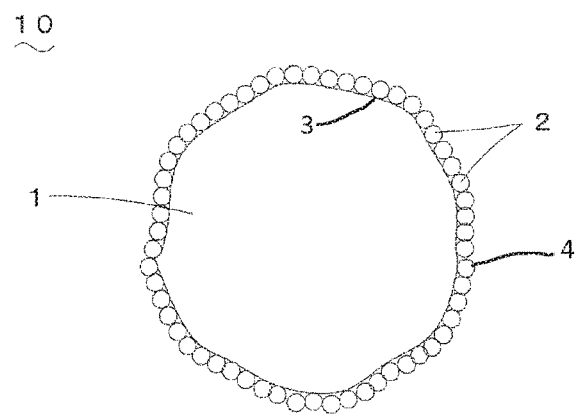
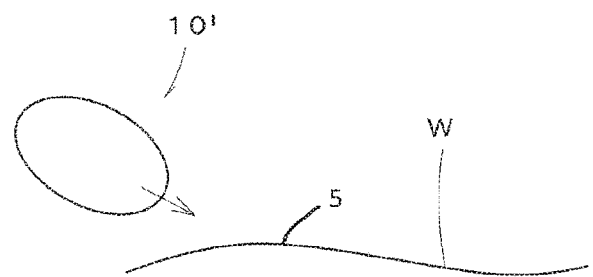
Fig. 2(A)
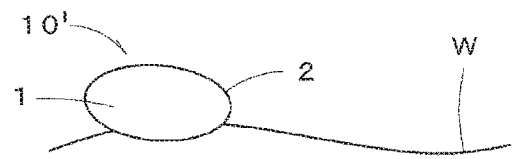
Fig. 2(B)
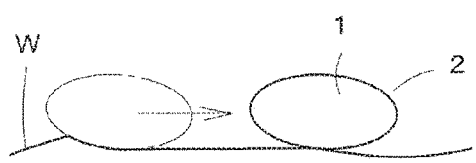
Fig. 2(C)
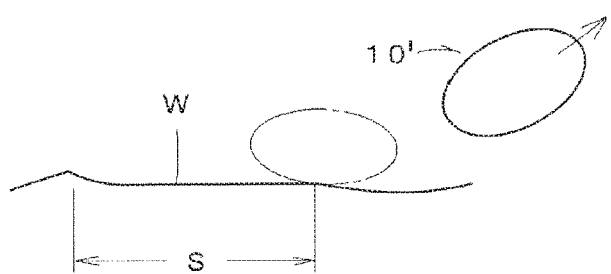
Fig. 2(D)

ABRASIVE MATERIAL

TECHNICAL FIELD

This disclosure relates to abrasive materials for use in surface finishing of workpieces, which can be applied to a wide variety of surfaces including metal, ceramic, and plastic, to composites thereof, and in particular to abrasive materials for semi-finishing and polishing workpieces having a complicated surface shape.

BACKGROUND

Various methods for grinding, polishing, or finishing the surface of a workpiece have heretofore been provided. It is, however, necessary to select a method to be used according to the purpose of finishing or the like or the material or shape of a workpiece. More specifically, for example, casts need to be subjected to rough finishing and then polishing, and on the other hand, some precision components are finally subjected to finishing to have a smooth lustered surface. Further, a grinding method or the like is different between when a workpiece is made of metal and when a workpiece is made of ceramic.

Therefore, it is conventionally necessary to use different abrasive materials or grinding methods for different materials of workpieces or different purposes of finishing or the like, and accordingly it is also necessary to change the grinding tool to be used. For this reason, surface finishing of a workpiece naturally requires time and effort.

It is difficult for any one of the conventional methods to perform finishing or the like of a workpiece having a complicated surface shape efficiently. Particularly, industrial molds or dies or dental implants have complicated uneven surfaces, and therefore polishing of their surfaces requires time and effort. There is also a serious problem with the hygiene of workers because a large amount of dust of abrasive grains is produced in the working environment. As described above, many fundamental problems relating to grinding or polishing, such as poor workability and poor working conditions in a wide range of fields, have not yet been practicably solved.

In light of the above problems of the conventional conditions, Japanese Patent No. 3800610, the entire contents of which are incorporated herein by reference, discloses an abrasive material that enables finishing or the like in a short time even on a complex surface and maintain good working conditions. That abrasive material comprises a plurality of abrasive material particles, each having a core of an artificial composition, such as a synthetic resin foamed material or rubber, and an abrasive grain layer comprising abrasive grains and provided on a surface of the core via a non-curable adhesive as a binder.

Though comprising abrasive material particles having a simple structure in which an abrasive grain layer is provided on the surface of a core, that abrasive material allows a workpiece to have a desired finished surface simply by changing the amount of the abrasive material to be sprayed or the spraying speed of the abrasive material. Further, more precise finishing can be achieved by changing the core or the abrasive grains. The use of a non-curable adhesive as a binder makes it possible, when the abrasive grains are detached from the abrasive material particles due to the use of the abrasive material, to again attach the abrasive grains without again applying the binder due to the long-lasting tackiness of the binder.

Japanese Patent No. 3800610 discloses that the amount of the abrasive material to be sprayed or the spraying speed of the abrasive material is adjusted according to the purpose of surface finishing, and that more precise finishing is achieved by selecting the core or the abrasive grains according to the purpose, but the binder still has a room for improvement from the viewpoint of improving grinding performance because attention is given only to its tack force allowing the abrasive grains to be attached to the selected core or its ability to allow the abrasive grains to be reattached to the selected core.

More specifically, in the abrasive material disclosed in the aforementioned Japanese Patent No. 3800610, the binder has the important function of holding the abrasive grains on the surface of the core. However, that invention does not disclose that when the core or the abrasive grains is/are changed according to the purpose of surface finishing, the type or property of the binder is also changed. That is, the mechanical property or the like of the binder in actual surface finishing is not taken into consideration. More specifically, a grinding force required of the abrasive material is different between when the purpose of surface finishing is rough finishing and when the purpose of surface finishing is polishing, but no measures are taken against the binder to allow the binder to actively contribute to the adjustment of a grinding force.

SUMMARY

In light of the above circumstances, in an embodiment, the composition of the disclosed abrasive material may be varied to provide a selected grinding force to achieve a desired surface finish on the workpiece.

Also in an embodiment, the disclosed abrasive material may be used for surface finishing by spraying onto a workpiece, and comprises a plurality of abrasive material particles, each of the particles having a core, a binder, and an abrasive grain layer adhered to the surface of the core by the binder, wherein the binder is a mixture of a non-curable adhesive used as a main ingredient to provide tackiness and another agent used to adjust hardness according to a desired finished surface roughness of the workpiece.

With the disclosed abrasive material, the binder (adhesive layer) between the surface of the core and the abrasive grain layer may be a mixture of a non-curable adhesive as a main ingredient and another agent for adjusting hardness, and the hardness of the binder is adjusted according to the desired finished surface roughness. The hardness of the binder, for example, is adjusted to be higher when the purpose of finishing is rough finishing, and is adjusted to be lower when the purpose of finishing is polishing or mirror polishing. Further, the hardness of the binder may be adjusted to be relatively higher when the abrasive grain layer is constituted from abrasive grains having a relatively larger grain size. As a result, the desired finished surface roughness can be more truly achieved as compared to when the abrasive grain layer is formed on the surface of the core via only the non-curable adhesive.

The hardness of the binder may be adjusted to be higher than that of the non-curable adhesive itself as a main ingredient. The use of the binder whose hardness is higher than that of the non-curable adhesive itself makes it possible to increase a grinding force (the degree of grinding of the surface of a workpiece) as compared to when the non-curable adhesive is used alone as a binder.

On the other hand, the hardness of the binder may be adjusted to be lower than that of the non-curable adhesive itself as a main ingredient. In that case, a grinding force is less than using the non-curable adhesive alone, but shock caused by collision of the abrasive material with a workpiece is also reduced, so that the surface of the workpiece is lustered.

More specifically, the binder exhibits the property of a cured material when being relatively hard, and exhibits the property of a fluid when being relatively soft.

The non-curable adhesive as a main ingredient is preferably a rubber-based or acrylic non-curable adhesive because it is relatively available and inexpensive.

When the hardness of the binder is adjusted to be relatively higher, the abrasive grain layer is preferably constituted from abrasive grains having a relatively larger grain size, and on the other hand, when the hardness of the binder is adjusted to be relatively lower, the abrasive grain layer is preferably constituted from abrasive grains having a relatively smaller grain size. This is because a grinding force varies depending on the hardness of the binder, and therefore when the binder is relatively hard, a grinding force can be further increased by constituting the abrasive grain layer from abrasive grains having a large grain size, and on the other hand, when the binder is relatively soft, mirror finishing can be achieved by constituting the abrasive grain layer from abrasive grains having a small grain size.

It is to be noted that, in embodiments, the disclosed abrasive material may be used for grinding, polishing, mirror finishing, or the like of the surface of a workpiece (hereinafter, simply referred to as "surface finishing"), and is used by obliquely spraying onto the surface of a workpiece. Here, the term "core" refers to a particulate carrier for supporting the abrasive grain layer, and therefore the core is required to be made of a material to which abrasive grains can be attached due to its affinity for the binder. However, the size, shape, specific gravity, hardness, etc. of the core may be changed as appropriate.

On the other hand, the term "binder" may refer to one having an adhesive force or tack force allowing at least abrasive grains to be attached to the surface of the core. However, when such a binder has a property to be cured with time, it is impossible to reattach the abrasive grains to the surface of the core unless it has re-wettability like, for example, polyvinyl alcohol. Therefore, the present invention uses a binder containing a non-curable adhesive as a main ingredient. Here, the term "adhesive" does not refer only to a so-called pressure-sensitive adhesive used for packing tape or the like, but is defined as one that has the above-described adhesive strength, that is not cured with time, and that maintains its tack force (adhesive force) even after abrasive grains are detached. A specific example of such an adhesive is gum. Such an adhesive makes it possible to again attach abrasive grains to the surface of the core of the abrasive material particles from which the abrasive grains have been once detached due to the one-time use of the abrasive material (re-formation of abrasive grain layer). However, the tack force of the adhesive is adjusted according to, for example, the purpose of finishing or the spraying speed of the abrasive material according to the present invention.

Conventionally, desired surface finishing may be achieved by appropriately selecting a core or abrasive grains. However, in embodiments, a hardness-adjusted binder also may be added as a factor for achieving desired surface finishing, and therefore even when the same core and abrasive grains are used, more precise surface finishing may be performed to truly achieve a desired surface roughness, and further the range of ability to perform surface finishing can be expanded than ever before.

BRIEF DESCRIPTION OF THE DRAWINGS

FIG. 1 is a conceptual depiction of an embodiment of a typical abrasive material particle comprising the disclosed abrasive material;

FIGS. 2(A), 2(B), 2(C), and 2(D) are conceptual depictions showing the steps of grinding the surface of a workpiece with the use of the disclosed abrasive material particles using a relatively hard binder.

DETAILED DESCRIPTION

Figure 3A:
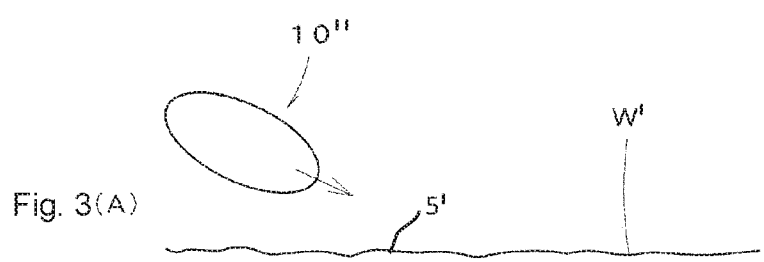
FIGS. 3(A), 3(B), 3(C), and 3(D) are conceptual depictions showing the steps of grinding the surface of a workpiece with the use of the abrasive material particles according to the present invention using a relatively soft binder.

Embodiments of the disclosed abrasive material will be described with reference to the attached drawings. FIG. 1 is a sectional view conceptually showing an abrasive material particle 10 of an embodiment of the disclosed abrasive material. The abrasive material particle 10 may be obtained by cutting an elastic porous body having a plurality of pores independent of each other, such as a synthetic resin foamed material, to have a size of, for example, about 50 μm to 5 mm to form a core 1 and then forming an abrasive grain layer 2 comprising abrasive grains having a grain size of, for example, 0.1 μm to 30 μm on the surface of the core 1 via a binder 3. When the surface of a workpiece is finished using the abrasive material particles 10, the abrasive material particles 10 are obliquely sprayed onto the surface of the workpiece with the use of an appropriate spraying apparatus, injection apparatus, or the like.

The core 1 may function as a carrier that supports the grains 4 of the abrasive grain layer 2 via the binder 3 having an affinity for the core 1. The material of the core 1 may be an artificial composition, such as rubber, other than the above-mentioned synthetic resin foamed material. Alternatively, a natural composition such as corn may also be used. When the core 1 has a smaller size, collision energy applied to a workpiece is lower, and therefore the abrasive grain layer 2 is less likely to be detached from the core 1. A soft core 1 having a low specific gravity may be suitable for use in mirror finishing or polishing, and a hard core having a high specific gravity may be suitable for use in grinding. Therefore, the material, size, etc. of the core 1 are selected according to the material of a workpiece or the purpose of finishing or the like.

On the other hand, in various embodiments the binder 3 may satisfy one or more of the following requirements: (1) long-lasting tack performance; (2) great tack force; (3) excellent handleability; and (4) excellent environmental characteristics. A binder 3 that may satisfy all of the foregoing requirements is, for example, gum. When the binder 3 satisfies the requirement (1), abrasive grains 4 may be attached to the core 1 two or more times, such that the core 1 may be reused.

More specifically, the binder satisfying the requirement (1) may correspond to a non-curable adhesive, but may be a re-wettable adhesive. When the binder satisfies the requirement (2), the abrasive grain layer 2 may be prevented from being improperly detached. However, if the tack force of the binder 3 is too great, there may be a disadvantage that dust is attached to the abrasive material particles, or the maintenance of an injection apparatus requires a lot of effort due to the attachment of the abrasive material particles 4 to the injection apparatus. For this reason, the tack force of the binder 3 may be adjusted according to, for example, the type of injection apparatus to be used, the spraying speed of the abrasive material particles, or the purpose of finishing.

It is to be noted that the tack force of the binder 3 may be adjusted by one or more of, for example, selecting the binder itself from specific binders, dilution with water, and/or mixing with another agent, but other means may be employed. In embodiments of the abrasive material 10, at least the abrasive grain layer 2 may be attached to the surface of the core 1, and have adhesiveness or tackiness sufficient to prevent the abrasive grain layer 2 from being detached during spraying. When the binder 3 satisfies the requirement (3), the abrasive grain layer 2 may be formed on the surface of the core 1 with excellent workability. When the binder 3 satisfies the requirement (4), workers etc. may not be adversely affected.

In the present invention, the core 1 or abrasive grains 4 constituting the abrasive grain layer 2 is/are selected according to a desired surface roughness achieved by surface finishing, and further a binder appropriate to this surface roughness is used. In the present invention, this binder 3 may be a mixture of a non-curable adhesive used as a main ingredient to provide tackiness and another agent used to adjust hardness according to a desired surface roughness of the workpiece.

More specifically, in the case of surface finishing, such as rough finishing, requiring a relatively great grinding force, a relatively hard binder 3 may be used. Such a relatively hard binder 3 may be obtained as a cured material by mixing a synthetic resin as a cured material with a non-curable adhesive. When an acrylic non-curable adhesive is used as a main ingredient, an acrylic resin may be mixed as an auxiliary ingredient. In an embodiment, a standard mixing ratio between the main ingredient and the auxiliary ingredient is 1:1, but may be adjusted according to, for example, the grain size of abrasive grains 4 constituting the abrasive grain layer 2.

In the case of surface finishing, such as polishing or mirror finishing, required to reduce a grinding force but enhance the ability of the abrasive material particles to absorb shock energy, a relatively soft binder 3 may be used. Such a relatively soft binder 3 may be obtained as a fluid by mixing a solvent as a fluid, such as a plasticizer, with a non-curable adhesive. When an acrylic non-curable adhesive is used as a main ingredient, an adipate-based plasticizer, a phthalate-based plasticizer, a polyvinyl alcohol plasticizer, or the like is mixed as an auxiliary ingredient. It is to be noted that a standard mixing ratio between the main ingredient and the auxiliary ingredient is 2:1, but can be adjusted according to, for example, the grain size of abrasive grains 4 like the above.

The steps of grinding the surface of a workpiece by the abrasive material particles 10' are shown in FIGS. 2(A), 2(B), 2(C), and 2(D). First, as shown in FIG. 2(A), the abrasive material particles 10 are obliquely sprayed onto the surface 5 of a workpiece W with the use of an appropriate spraying apparatus (not shown), which may be the apparatus shown and described in U.S. Pat. No. 6,146,247 titled METHOD AND APPARATUS FOR GRINDING THE SURFACE OF A WORK, or the apparatus shown and described in copending U.S. application Ser. No. 14/773,777 titled ABRASIVE GRAIN JET GRINDING DEVICE, the entire contents of both of which are incorporated herein by reference. Then, the abrasive material particles 10' collide with the surface 5 of the workpiece W, and are at the same time plastically deformed to start grinding of the surface of the workpiece W (see FIG. 2(B)). Next, the abrasive material particles 10' slide on the surface of the workpiece W while being deformed so that the surface of the workpiece W is ground by the abrasive grains 2 by a distance S traveled by each individual abrasive material particle 10 (see FIG. 2(C)). The abrasive material particles 10' are repelled from the surface of the workpiece W to complete grinding (see FIG. 2(D)).

As can be seen from the above grinding steps, substantially the same finishing effect as polishing using sandpaper can be obtained by the abrasive material particles 10' in an embodiment of the disclosed process by adjusting the amount of the abrasive material particles 10' to be sprayed, the spraying speed of the abrasive material particles 10', and the spraying angle of the abrasive material particles 10'. On the other hand, the degree of finishing of the workpiece W can also be changed by adjusting the spraying speed of the abrasive material particles 10'. For example, when the surface 5 of the workpiece W is made of a soft material or a fragile material, excessive grinding can be prevented by reducing the spraying speed of the abrasive material particles 10' to achieve excellent surface finishing of the workpiece. That is, the kinetic energy of the abrasive material particles 10' may be adjusted by adjusting the spraying speed of the abrasive material particles 10' so that a frictional force between the abrasive material particles 10' and the surface 5 of the workpiece W, that is, a grinding force generated by the abrasive grains 2 may be adjusted.

Further, in embodiments compressed air may be sprayed concurrently with the spraying of the abrasive material particles 10' depending on the surface shape of a workpiece. The reason for this is as follows. When the surface of a workpiece has recesses, there is a case where the efficiency of grinding is reduced due to the accumulation of the abrasive material particles 10 in the recesses. However, since the abrasive material particles 10 have a low specific gravity, the abrasive material particles 10 can be quickly removed from the recesses by spraying compressed air into the recesses, which makes it possible to increase the efficiency of grinding.

In embodiments where a relatively hard binder and abrasive grains having a relatively large grain size are used, as shown in FIGS. 2(A)-(D), the abrasive grains deeply dig into a workpiece when the abrasive material particles 10' collide with the workpiece, and the abrasive grains 4 thereof are not released from the surface of the core 1 due to the tackiness of the binder 3 and therefore remain between the workpiece W and the core so that a grinding force is increased.

Figure 3B:
Figure 3C:
Figure 3D:
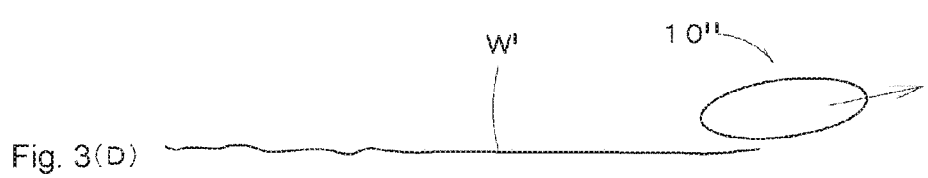

In an embodiment where a relatively soft binder 3 and abrasive grains 5 having a relatively small grain size are used, as shown in FIGS. 3(A), 3(B), 3(C), and 3(D), shock caused by collision of the abrasive material particles 10" with a workpiece W' is reduced due to the fluidity of the binder 3, and therefore the abrasive grains 4 slightly dig into the workpiece so that the surface of the workpiece is lustered.

It is to be noted that, in an embodiment, the abrasive grain layer 2 may be a single layer, but in other embodiments, formation of two or more abrasive grain layers is also significant. This is because even when the outer layer is detached due to the use of the abrasive material particles 10, the inner layer makes it possible to still use the abrasive material particles 10. The abrasive grain layer 2 comprising two or more layers may be formed by the following two methods. In a first method, a binder 3 may be applied onto the surface of the core 1, and then the abrasive grain layer 2 may be formed by sprinkling abrasive grains 4 on the binder 3. In a second method, a binder 3 and abrasive grains 4 are previously kneaded, and then the abrasive grain layer 2 is formed by attaching the kneaded material to the surface of the core 1. The abrasive grain layer 2 may be formed on the surface of the core 1 by either of these methods. However, the second method makes it possible to uniformly form the abrasive grain layer 2 on the surface of the core with excellent workability.

When the abrasive grain layer 2 comprising two or more layers is formed by the first method, application of a binder 3 and sprinkling of abrasive grains 4 are alternately performed on the surface of the core 1. When the abrasive grain layer 2 comprising two or more layers is formed by the second method, a kneaded material of a binder and abrasive grains is attached to the surface of a workpiece several times. When the abrasive grain layer 2 comprising two or more layers is formed in such a manner, the same abrasive material particles 10 can be used two or more times without the necessity to attach the abrasive grains 2 after each use.

While the materials and methods described herein constitute preferred embodiments of the disclosed abrasive material and method for making the abrasive material, it is to be understood that the invention is not limited to these precise embodiments, and that changes may be made thereto without departing from the scope of the invention.

What is claimed is:

1. An abrasive material sized to be used for surface finishing by spraying onto a workpiece, the abrasive material comprising:
    a plurality of abrasive material particles sized to be used for surface finishing by spraying onto the workpiece, each of the abrasive material particles having a core, a binder, and an abrasive grain layer, made up of abrasive grains, formed on a surface of the core via the binder, wherein the binder is between the surface of the core and the abrasive grain layer, the binder is a mixture of a non-curable adhesive used as a main ingredient to provide tackiness and another agent used to adjust hardness according to a desired finished surface roughness of the workpiece, wherein the non-curable adhesive maintains an adhesive force after the abrasive material particles are removed by use sufficient for the abrasive grains to adhere thereto, so that the core and binder can be reused; and
    wherein the hardness of the binder is adjusted to be higher than that of the non-curable adhesive itself as a main ingredient.

2. The abrasive material according to claim 1, wherein the binder includes a cured material.

3. The abrasive material according to claim 1, wherein the binder is a fluid.

4. The abrasive material according to claim 1, wherein the non-curable adhesive as a main ingredient is selected from a rubber-based adhesive and an acrylic non-curable adhesive.

5. An abrasive material sized to be used for surface finishing by spraying onto a workpiece, the abrasive material comprising:
    a plurality of abrasive material particles sized to be used for surface finishing by spraying onto the workpiece, each of the abrasive material particles having a core, a binder, and an abrasive grain layer, made up of abrasive grains, formed on a surface of the core via the binder, wherein the binder is between the surface of the core and the abrasive grain layer, the binder is a mixture of a non-curable adhesive used as a main ingredient to provide tackiness and another agent used to adjust hardness according to a desired finished surface roughness of the workpiece, wherein the non-curable adhesive maintains an adhesive force after the abrasive material particles are removed by use sufficient for the abrasive grains to adhere thereto, so that the core and binder can be reused; and
    wherein the hardness of the binder is adjusted to be lower than that of the non-curable adhesive itself as a main ingredient.

6. The abrasive material according to claim 5, wherein the binder includes a cured material.

7. The abrasive material according to claim 5, wherein the binder is a fluid.

8. The abrasive material according to claim 5, wherein the non-curable adhesive as a main ingredient is selected from a rubber-based adhesive and an acrylic non-curable adhesive.

* * * * *